US011304381B2

(12) United States Patent
Bailey

(10) Patent No.: US 11,304,381 B2
(45) Date of Patent: Apr. 19, 2022

(54) DECOMPOSABLE PLANT CONTAINER WITH RINGS AND RELATED METHODS

(71) Applicant: BE SUSTAINABLE TECHNOLOGIES, LLC, Destin, FL (US)

(72) Inventor: Gary Bailey, Mobile, AL (US)

(73) Assignee: BE SUSTAINABLE TECHNOLOGIES, LLC, Destin, FL (US)

( * ) Notice: Subject to any disclaimer, the term of this patent is extended or adjusted under 35 U.S.C. 154(b) by 247 days.

(21) Appl. No.: 16/672,768

(22) Filed: Nov. 4, 2019

(65) Prior Publication Data

US 2020/0137962 A1 May 7, 2020

Related U.S. Application Data

(60) Provisional application No. 62/754,747, filed on Nov. 2, 2018.

(51) Int. Cl.
*A01G 9/029* (2018.01)
*A01G 9/00* (2018.01)

(52) U.S. Cl.
CPC ...... *A01G 9/0291* (2018.02); *A01G 2009/003* (2013.01)

(58) Field of Classification Search
CPC ............ A01G 9/0291; A01G 2009/003; B65D 88/128; B65D 88/129
USPC ........................................ 220/648
See application file for complete search history.

(56) References Cited

U.S. PATENT DOCUMENTS

| 1,113,350 | A | * | 10/1914 | Inman | A01G 9/0291 |
| | | | | | 47/74 |
| 1,192,824 | A | * | 7/1916 | Bohlman | A01G 9/0295 |
| | | | | | 47/73 |
| 1,774,019 | A | * | 8/1930 | Lam | A01G 23/02 |
| | | | | | 47/73 |
| 1,776,375 | A | * | 9/1930 | Russell | A01G 9/02 |
| | | | | | 47/73 |
| 2,140,932 | A | * | 12/1938 | Avery | A01G 9/026 |
| | | | | | 47/74 |
| 2,656,969 | A | * | 10/1953 | Kvasnok | B65D 7/04 |
| | | | | | 229/4.5 |
| 2,968,124 | A | * | 1/1961 | Milog | A01G 9/026 |
| | | | | | 47/73 |
| 3,102,364 | A | | 9/1963 | Pullen | |
| 4,022,115 | A | | 5/1977 | Greenwich | |
| 5,282,335 | A | * | 2/1994 | Holtkamp, Jr. | A01G 27/04 |
| | | | | | 47/70 |
| 5,308,663 | A | | 5/1994 | Nakagawa et al. | |
| 5,806,242 | A | * | 9/1998 | Park | A01G 27/06 |
| | | | | | 47/81 |

(Continued)

*Primary Examiner* — Brady W Frazier
*Assistant Examiner* — Zoe Tam Tran
(74) *Attorney, Agent, or Firm* — Allen, Dyer, Doppelt + Gilchrist, PA

(57) ABSTRACT

A plant container may include a vertical wall surrounding a plant receiving recess and having vertically aligned slot sets. The plant container may have a bottom including a panel, and panel tabs extending from a periphery of the panel. The panel tabs are to be received by a lowermost vertically aligned slot set. The plant container may include a ring having ring tabs on an inner radial edge, and the ring tabs may be received by a respective vertically aligned slot set.

20 Claims, 9 Drawing Sheets

(56) References Cited

U.S. PATENT DOCUMENTS

| | | | |
|---|---|---|---|
| 5,983,566 A | 11/1999 | Enderlein et al. | |
| 6,427,379 B1 * | 8/2002 | Lehner | A01G 9/02 47/66.1 |
| 10,542,682 B1 * | 1/2020 | McCoy | A01G 17/06 |
| 2003/0213175 A1 * | 11/2003 | Rhindress | A01G 9/029 47/73 |
| 2005/0102892 A1 * | 5/2005 | Jones | A01G 13/0243 47/29.7 |
| 2010/0031567 A1 | 2/2010 | Ellegaard | |
| 2011/0232175 A1 * | 9/2011 | Cirello | A01G 9/026 47/32.7 |
| 2011/0289838 A1 * | 12/2011 | Cirello | A01G 9/021 47/65.7 |
| 2012/0139151 A1 | 6/2012 | Chen et al. | |
| 2015/0144749 A1 * | 5/2015 | Leyshon | A01G 9/02 248/97 |
| 2016/0101897 A1 * | 4/2016 | Allen | B65D 11/1873 220/4.28 |
| 2020/0337248 A1 * | 10/2020 | Munt, III | A01G 9/026 |

\* cited by examiner

DECOMPOSABLE PLANT CONTAINER WITH RINGS AND RELATED METHODS

RELATED APPLICATION

This application is based upon prior filed Application No. 62/754,747 filed Nov. 2, 2018, the entire subject matter of which is incorporated herein by reference in its entirety.

TECHNICAL FIELD

The present disclosure relates to the field of containers, and, more particularly, to plant containers and related methods.

BACKGROUND

The agricultural and horticultural industries are dependent on plastic or high-resin pots due to their structural integrity. Sturdy pots are required for automated processes, such as robotic arms gripping and transporting the pots. During these automated processes, the pots can be subjected to heat and moisture, and the use of synthetic plastic plant pots can withstand these environmental conditions.

Synthetic plastic plant pots are undesirable for direct transplantation into the ground because of their inability to degrade and decompose. Thus, plastic or high-resin pots are often designed for single use and sit in landfills where they take decades to decompose. Introduction of bio-plastic pots have improved the amount of time it takes for the pot to degrade and decompose but the length of time is still generally too long to allow for direct planting in the ground. Additionally, synthetic plastic and bio-plastic pots are shipped from the manufacturer through the distribution chain fully assembled and thus take up valuable space during transportation and storage prior to use.

SUMMARY

Generally, a plant container may comprise a vertical wall surrounding a plant receiving recess and having a plurality of vertically aligned slot sets therein. The plant container may comprise a bottom having a panel, and a plurality of panel tabs extending from a periphery of the panel. The plurality of panel tabs may be received by a lowermost vertically aligned slot set. The plant container may comprise at least one ring having a plurality of ring tabs on an inner radial edge thereof, and the plurality of ring tabs may be received by a respective vertically aligned slot set.

Additionally, the at least one ring may comprise a plurality of rings. Each panel tab may comprise a proximal portion extending radially outward from the periphery of the panel, and a distal portion extending laterally to define first and second slots. Each ring tab may be rectangle-shaped.

In some embodiments, the panel may include a medial slot. The vertical wall may comprise a trapezoid-shaped panel with opposing first and second edges, and a connection coupling together the opposing first and second edges. The vertical wall, the bottom, and the at least one ring may comprise a decomposable material, such as a fiber material. For example, the fiber material may comprise at least one of old corrugated cartons (OCC), recycled bleached kraft (RBK), recycled refined bleach kraft (RRK), mid-density fiber (MDF), old news print (ONP), eucalyptus kraft (EK), eucalyptus refined kraft (ERK), eucalyptus bleached from mill (EBM), office white bleached kraft (OWB), agricultural grasses (AG), *Miscanthus giganteus* (MG), *Miscanthus giganteus* refined (MGR), peat fiber, coir, wheat straw, elephant grass, paper pulp, Bagasse fibers, wood fiber, flax, kenaf, sisal, and digested manure.

Another aspect is directed to a method for making a plant container. The method may comprise forming a vertical wall to surround a plant receiving recess and having a plurality of vertically aligned slot sets therein, and forming a bottom including a panel, and a plurality of panel tabs extending from a periphery of the panel. The plurality of panel tabs may be received by a lowermost vertically aligned slot set. The method may comprise forming at least one ring having a plurality of ring tabs on an inner radial edge thereof. The plurality of ring tabs may be received by a respective vertically aligned slot set.

DETAILED DESCRIPTION

Figure 1:
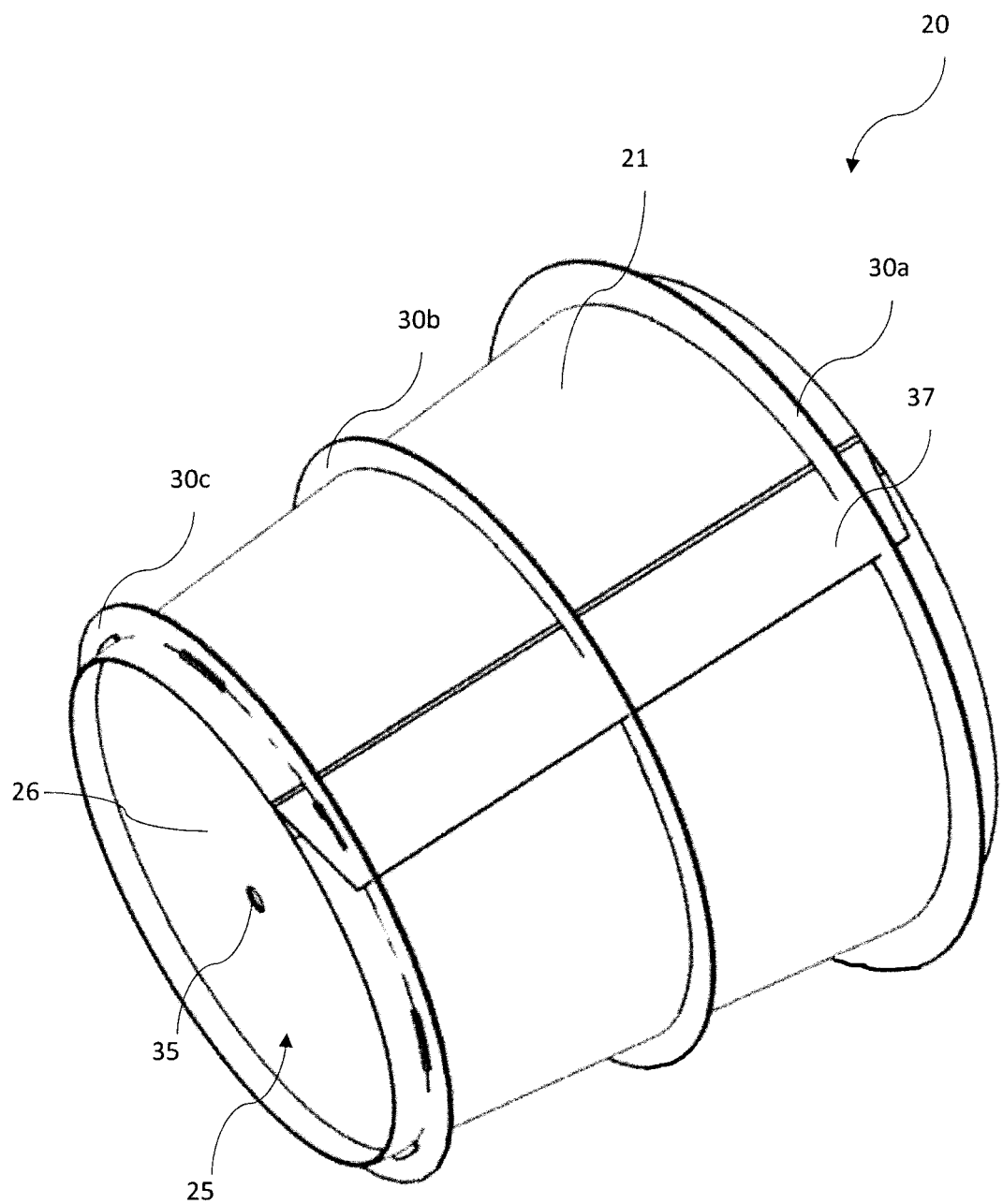
FIG. 1 is a schematic perspective view of a plant container, according to the present disclosure.

It may be helpful to have a fiber pot with structural integrity that allows for automated processing, could be shipped and stored knock-down flat for assembly directly prior to use, and could be directly transplanted into the ground by the end user.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

In accordance with the teaching of the present invention, a container with structural integrity is provided from fiber panels. In particular, an embodiment described herein may provide a fiber container comprising a predominately vertical wall and horizontally oriented bottom connected on the edge, and at least one ring-shaped support element extending along the circumference of the predominately vertically oriented wall and parallel to the horizontally oriented bottom. In another embodiment, the container has self-locking means to help maintain an erected container form. In some embodiments, the fiber is OCC, RBK, RRK, MDF, ONP, EK, ERK, EBM, OWB, AG, MG, MGR, manure, or combinations thereof.

In accordance with another aspect of the present invention, a method for forming the fiber container is provided. In some embodiments, the method comprises wrapping a trapezoidal-shaped wall panel having multiple lock slots around a mandrel wherein the panel is curved to a conical shape, inserting a circular bottom panel having an outside edge of multiple tabs wherein the multiple lock slots align and receive the multiple tabs, connecting the two shorter side edges of the trapezoidal-shaped wall panel by adhesive forming a tapered cone, connecting a ring-shaped panel having an inside edge of multiple tabs to the outside surface of the tapered cone wherein the multiple lock slots align and receive the multiple tabs.

The present invention is a container made of fiber that includes locking mechanisms that hold various container panels securely together. One such locking mechanism includes a locking tab and lock slot that engage one another as assembled.

The container panels described for making the container of the present disclosure can be formed by multiple non-limiting methods, namely, (i) a "laboratory" or soaking method, and (ii) a "factory" or slurry method. In other words, the fiber container of the present disclosure made by the "factory" method need not be made in a literal factory, and fiber containers of the present disclosure made by the "laboratory" method need not be made in a literal laboratory.

Furthermore, it is understood that other methods of producing the container panels are possible and entirely within the scope of the present disclosure. For example, the container panels can be formed by methods described in U.S. Pat. No. 9,605,384, the contents of which are incorporated herein by reference in their entirety. In some embodiments, the container panels can be sized accordingly to create one, three, five, or seven gallon containers.

The fiber container may be made up of any fibrous material. The fibrous material may be, for example, OCC, RBK, RRK, MDF, ONP, EK, ERK, EBM, OWB, AG, MG, MGR, manure, or combinations thereof. The fibrous material may comprise, for example, peat fiber, coir, wheat straw, elephant grass, paper pulp, Bagasse fibers, wood fiber, flax, kenaf, sisal, digested manure (from bovine, swine, sheep, chicken, turkey, or the like), or combinations thereof. This list is not meant to be limiting, as many other fibrous materials may also be used.

In certain embodiments, the fiber container comprises OCC and manure. The fiber container may also comprise other organic materials, such as digested manure. In one embodiment, the fiber container comprises OCC and straw. In another embodiment, the fiber container comprises OCC and kenaf.

The panel or panels, as used herein, refer to the separate pieces of the container that are then assembled to create the container. The panels have properties to increase the break point strength (for wet or dry pot), hydrophobicity, fungal growth resistance, time dependent degradation, or any combination of these properties of the panel relative to a standard biodegradable container.

A container made of fiber incorporating the self-locking means disclosed is depicted at in FIG. 1. The container comprises a bottom wall, a predominately vertically oriented wall, and at least one ring-shaped support element.

Figure 2:
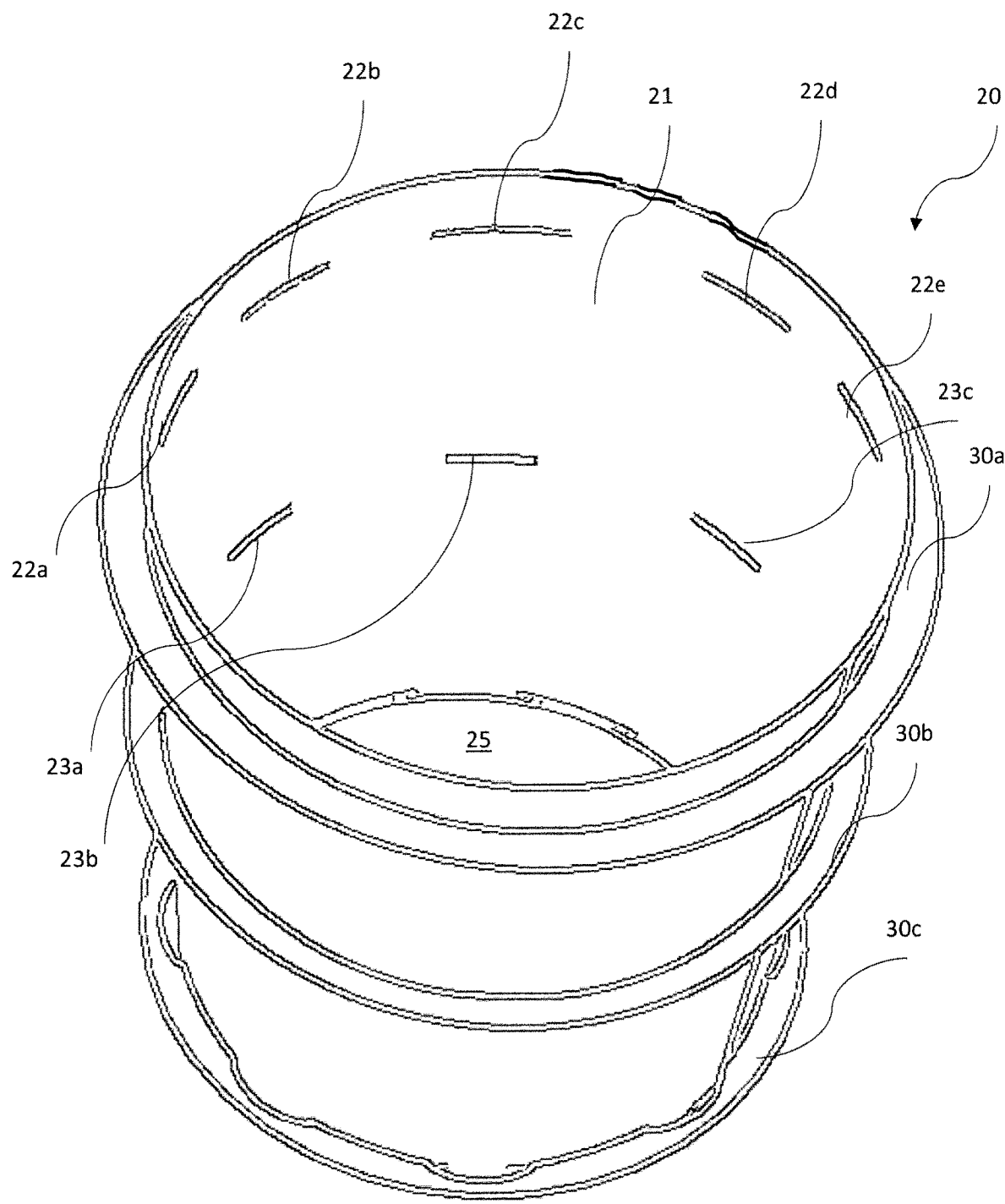
FIG. 2 is a schematic top perspective view of the plant container of FIG. 1.

As depicted in FIG. 2, a plurality of openings are formed in the predominantly vertically oriented wall. The openings as depicted are rectangle in shape but in other embodiments the openings can be oval or rectangle with rounded corners or some other shape wherein the self-locking mechanism of the present invention can hold the various container panels securely together.

Figure 3A:
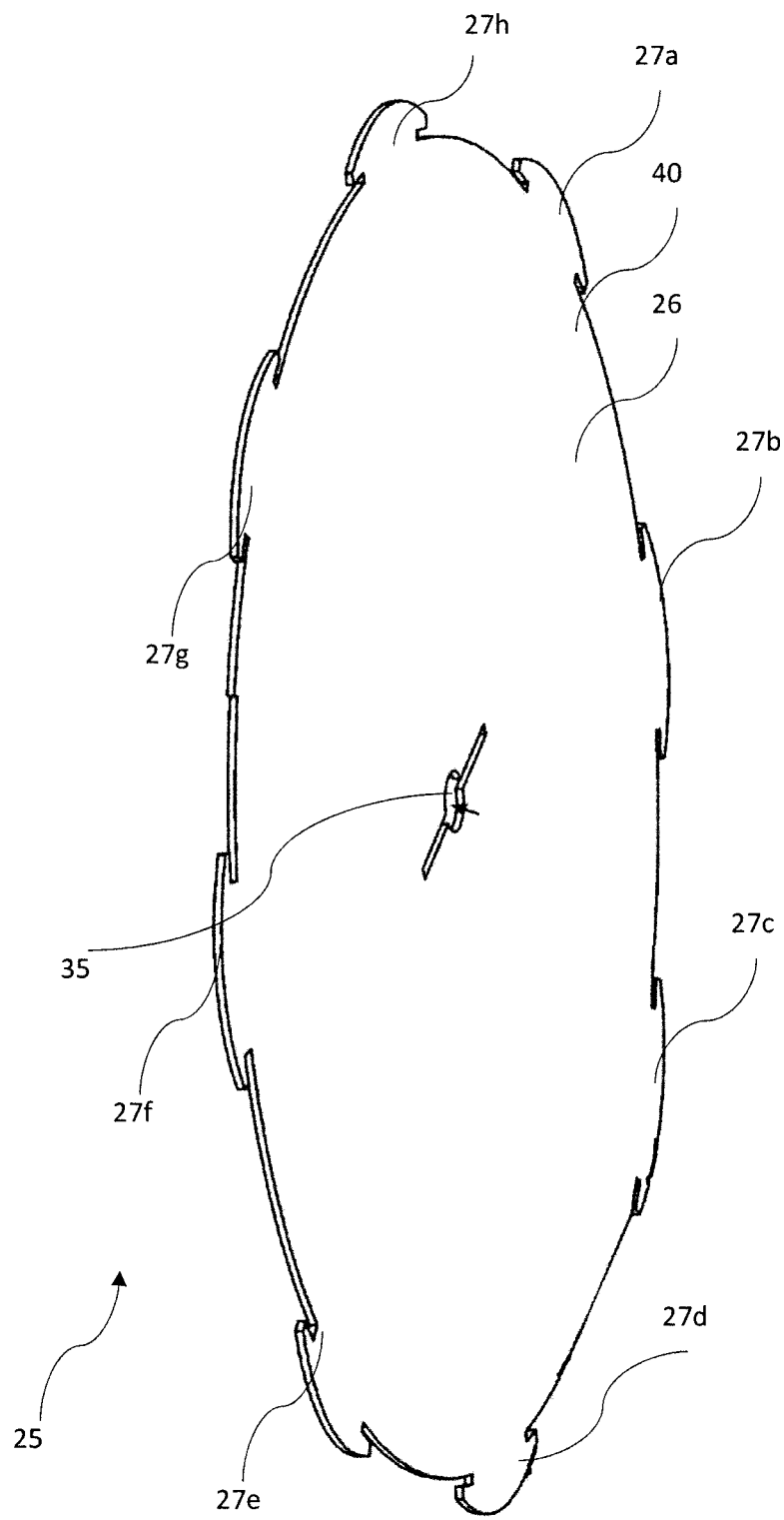
FIG. 3A is a schematic top perspective view of the bottom from the plant container of FIG. 1.

The circular bottom panel is depicted in FIG. 3A. The bottom panel includes multiple tabs on the outside edge. In some embodiments, the tabs may be mushroom-shaped, with the base of the mushroom aligning with the outside edge of the circular bottom panel. In other embodiments, the tabs may be trapezoid shaped. In some embodiments, the bottom panel may have an opening. The opening, for example, may be used for drainage of liquids. In another example, the opening, may be used for growth of tap root of a plant.

Figure 4:
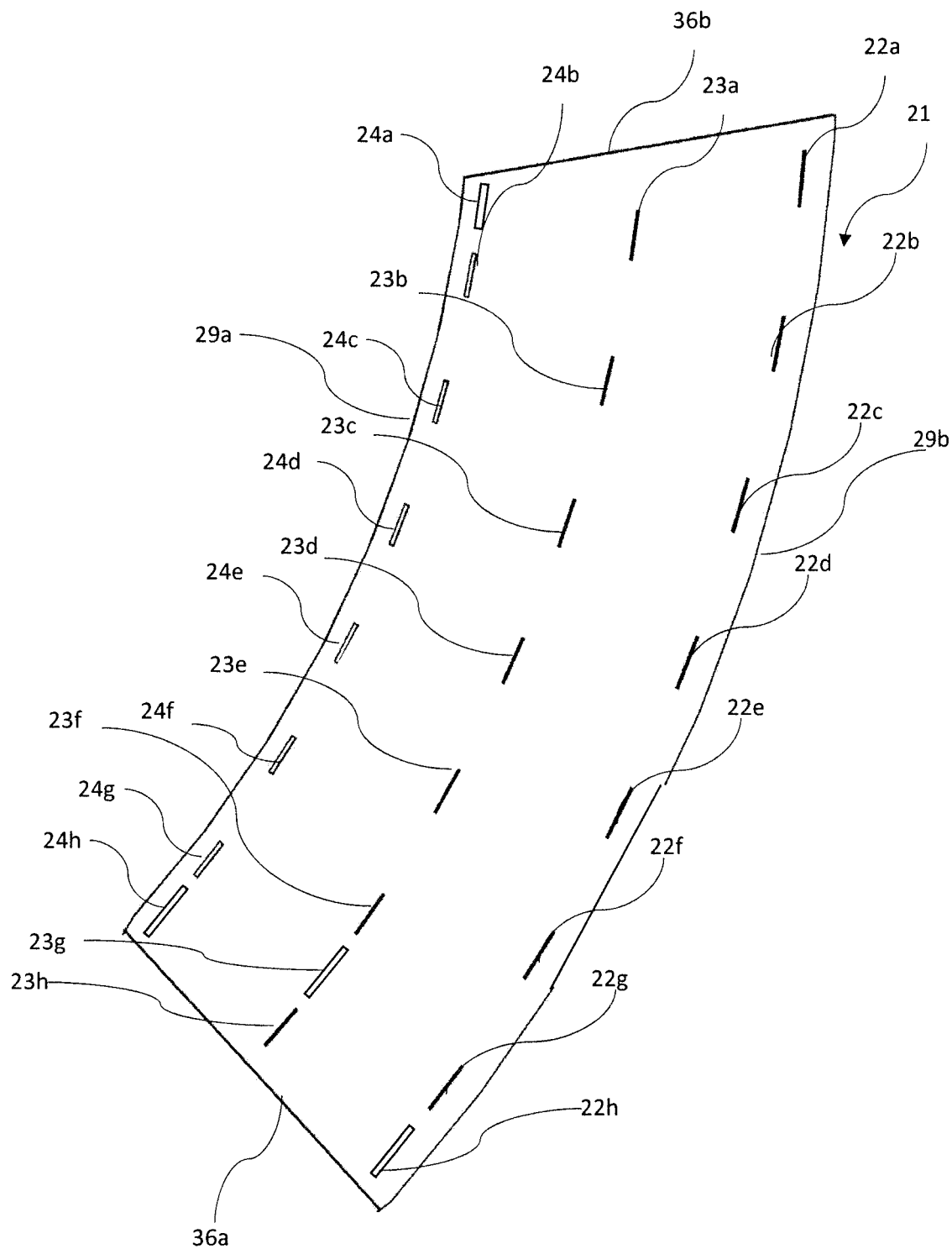
FIG. 4 is a schematic top perspective view of the vertical wall from the plant container of FIG. 1.

FIG. 4 shows the trapezoidal-shaped wall panel. The bottom edge aligns with the bottom panel when fiber container is assembled. (See FIG. 1.) The top edge creates the opening to the fiber container when assembled. The side edges, are connected to each other and secured with adhesive to erect the predominately vertically oriented wall.

Figure 5:
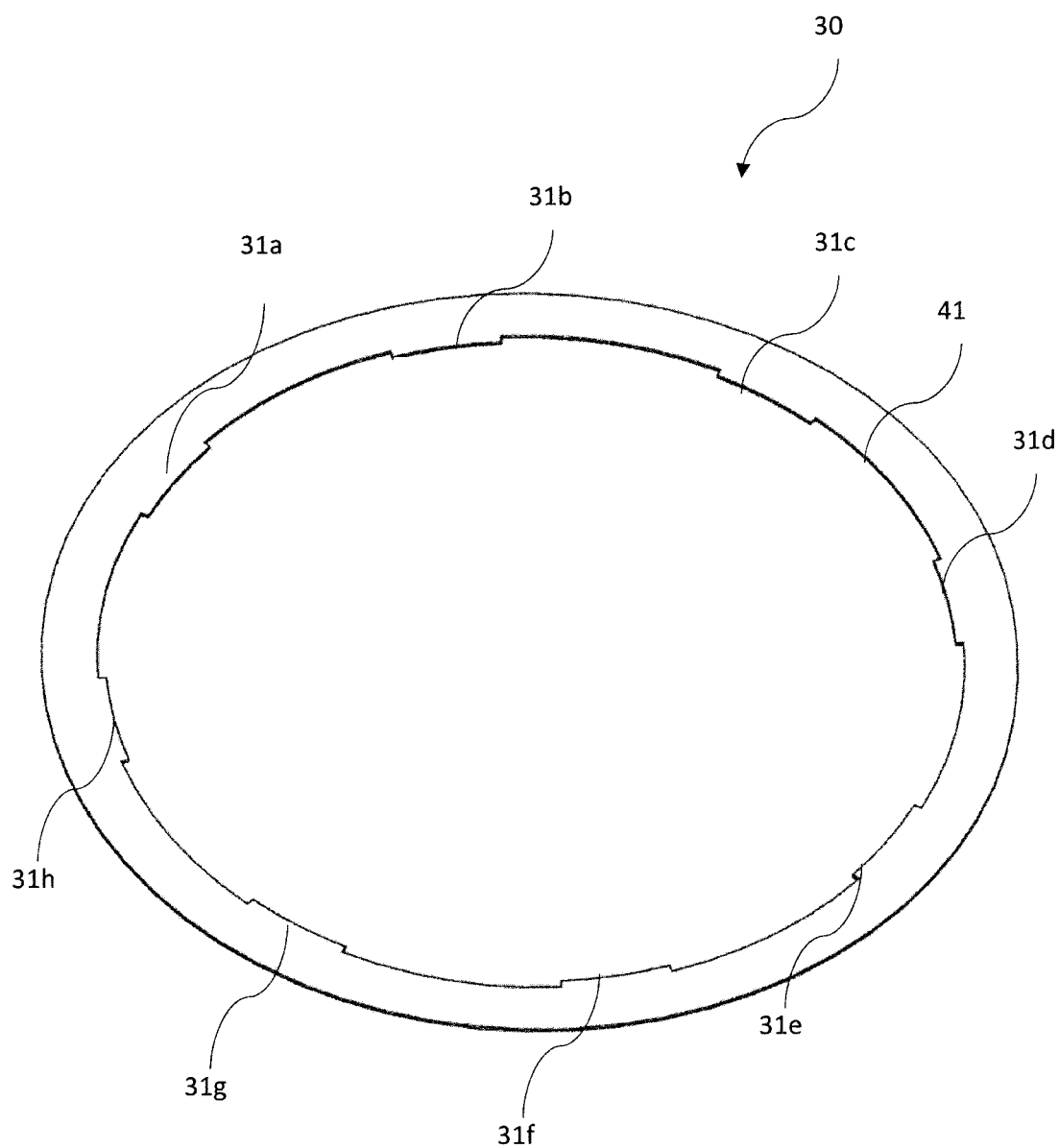
FIG. 5 is a schematic top perspective view of the ring from the plant container of FIG. 1.

The ring-shaped panel is depicted in FIG. 5. The ring-shaped support panel includes multiple tabs on the inside edge. In some embodiments, the tabs may be rectangular. The ring-shaped panel is attached on the outside of the predominately vertically oriented wall. The multiple tabs are aligned and inserted into the multiple openings on the predominately vertically oriented wall.

Figure 6:
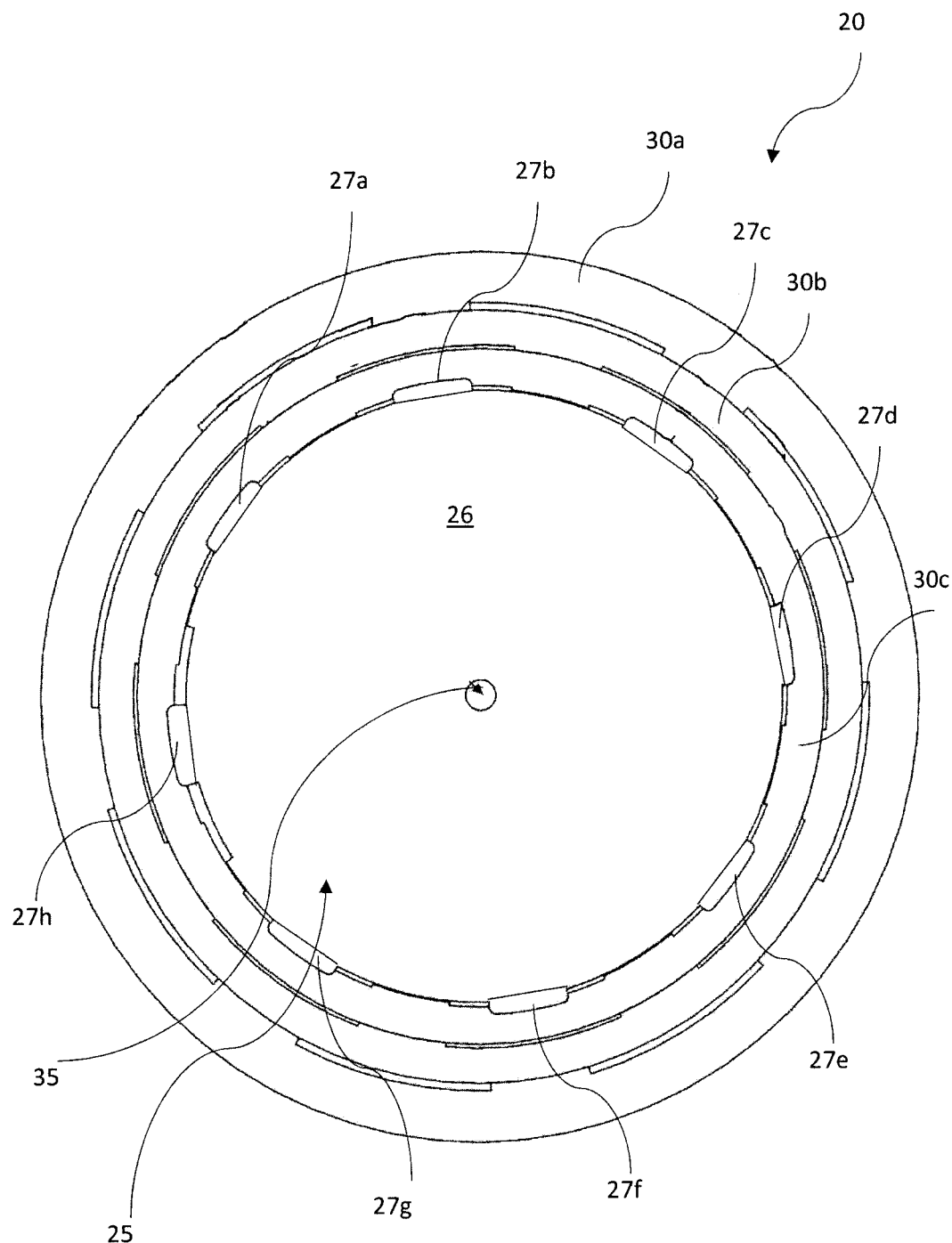
FIG. 6 is a schematic bottom plan view of the plant container of FIG. 1.

As shown in FIG. 6, the ring-shaped panel or panels and the circular bottom panel can be arranged for logistical improvement. In some embodiments, the panels of the present invention are shipped knock-down flat (KDF).

Figure 7:
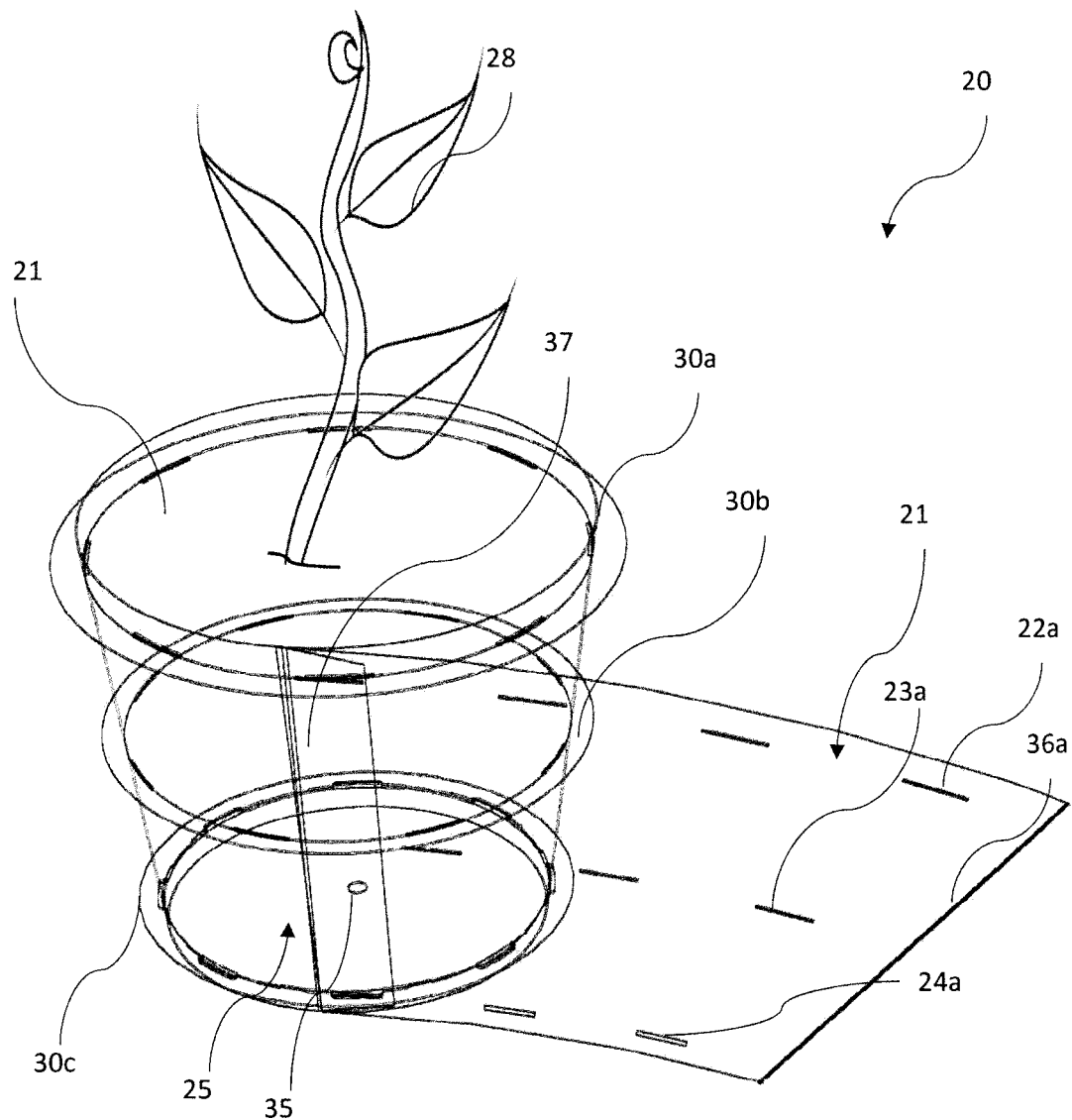
FIG. 7 is a schematic transparent perspective view of the plant container of FIG. 1 with the vertical wall partially exploded.

A transparent view of the fiber container is depicted in FIG. 7. Upon assembly, the predominately vertically oriented wall overlaps and can be sealed with adhesive.

To erect a container of FIG. 1, a trapezoidal-shaped wall panel having multiple lock slots can be formed around a mandrel wherein the panel is curved to a conical shape, a circular bottom panel having an outside edge of multiple tabs can be inserted into the multiple lock slots align and receive the multiple tabs, the two shorter side edges, of the trapezoidal-shaped wall panel can be connected by adhesive forming a tapered cone, a ring-shaped panel having an inside edge of multiple tabs can be coupled to the outside surface of the tapered cone wherein the multiple lock slots align and receive the multiple tabs.

Referring to FIGS. 1-7, a plant container 20 according to the present disclosure is now described. As described hereinabove, the plant container 20 is for receiving and carrying a plant 28 (FIG. 7). As will be appreciated, any of the features described above for the fiber container may be used in the presently described embodiment of the plant container 20.

As perhaps best seen in FIG. 4, the plant container 20 illustratively comprises a vertical wall 21 surrounding a plant receiving recess. The vertical wall 21 illustratively comprises a plurality of vertically aligned slot sets 22a-22h, 23a-23h, 24a-24h therein. In an assembled state, the vertical wall 21 illustratively comprises a substantially trapezoid-shaped panel with opposing first and second edges 36a-36b, and first and second opposing sides 29a-29b extending between the first and second edges. The vertical wall 21 illustratively includes a connection 37 coupling together the opposing first and second edges 36a-36b. In some embodiments, the connection 37 may comprise an adhesive layer (e.g. a biodegradable adhesive) between the opposing first and second edges 36a-36b. In other embodiments, the connection 37 may comprise a mechanical coupling, such as a stitching, or a stapling.

As perhaps seen in FIG. 5, the plant container 20 illustratively comprises a bottom 25. The bottom 25 illustratively includes a panel 26, and a plurality of panel tabs 27a-27h extending from a periphery 40 of the panel. The plurality of panel tabs 27a-27h are received by a lowermost vertically aligned slot set 24a-24f (FIG. 4) of the vertical wall 21. As will be appreciated, the plurality of panel tabs 27a-27h are received by the lowermost vertically aligned slot set 24a-24f from the inner radial side. In the illustrated embodiment, each slot in the plurality of vertically aligned slot sets 22a-22h, 23a-23h, 24a-24h is rectangle-shaped, but in other embodiments, each slot may comprise varying shapes, such as oval-shaped. The vertical wall 21 may be canted with respect to the bottom 25, for example, having an angle between 70-110 degrees.

Figure 3B:
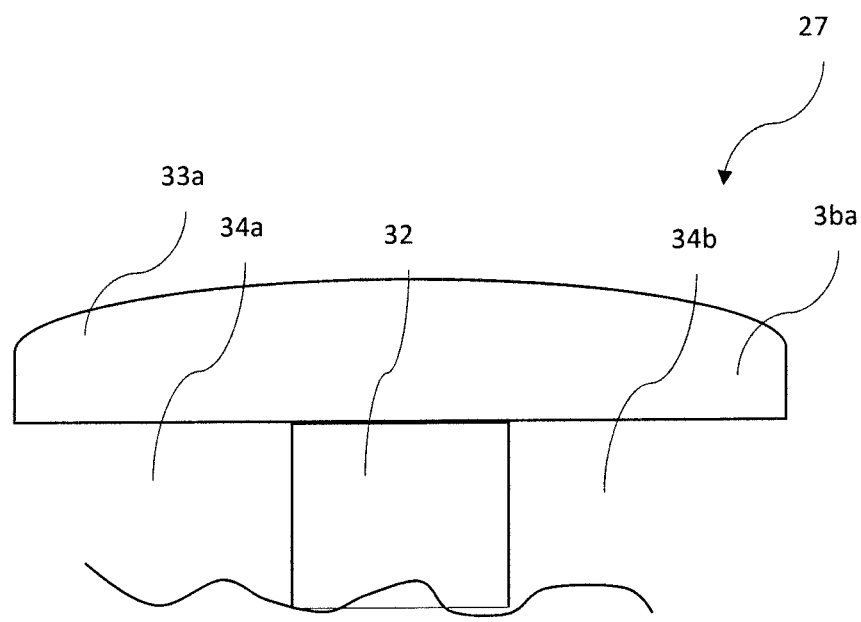
FIG. 3B is a schematic top plan view of the panel tab from the plant container of FIG. 1.

As perhaps best seen in FIGS. 3A-3B, each panel tab 27a-27h illustratively comprises a proximal portion 32 extending radially outward from the periphery 40 of the panel 26, and a first and second distal portions 33a-33b extending laterally to define first and second slots 34a-34b. In other words, each panel tab 27a-27h has a mushroom shape. As will be appreciated, the first and second slots 34a-34b are to receive adjacent portions of the vertical wall 21 about the lowermost vertically aligned slot set 24a-24f. Of course, in other embodiments, each panel tab 27a-27h comprises a rectangle-shape tab or an oval-shaped tab without the first and second slots 34a-34b, similar to the ring tabs noted below.

The plant container 20 illustratively comprises a plurality of rings 30a-30c. As perhaps best seen in FIG. 5, each of the plurality of rings 30a-30c comprises a plurality of ring tabs 31a-31h on an inner radial edge 41 thereof. The plurality of ring tabs 31a-31h is to be received by a respective vertically aligned slot set 22a-22h, 23a-23h, 24a-24h. As perhaps best seen in FIG. 6, the plurality of ring tabs 31a-31h are inserted in the respective vertically aligned slot set 22a-22h, 23a-23h, 24a-24h from outer radial side inwards. Each ring tab 31a-31h is illustratively rectangle-shaped, but may take on other shapes in other embodiments.

In the illustrated embodiments, the panel 26 illustratively comprises a medial slot 35 for drainage. The medial slot 35 may be circle-shaped (FIGS. 1 & 6-7) or may comprise a circle shape with bisecting rectangles (FIG. 3A).

The vertical wall 21, the bottom 25, and the plurality of rings 30a-30c may each comprise a decomposable material, such as a fiber material. Additionally, in some embodiments, the vertical wall 21, the bottom 25, and the plurality of rings 30a-30c may each comprise plant growth enhancing elements (e.g. fertilizer and/or nutrients) within the decomposable material. Also, in some embodiments, the vertical wall 21, the bottom 25, and the plurality of rings 30a-30c may comprise a hydrophobic coating layer to prevent breakdown of the plant container 20 in transit. For example, the fiber material may comprise at least one of OCC, RBK, RRK, MDF, ONP, EK, ERK, EBM, OWB, AG, MG, MGR, manure, peat fiber, coir, wheat straw, elephant grass, paper pulp, Bagasse fibers, wood fiber, flax, kenaf, sisal, hemp fiber, and digested manure.

For example, in some applications, the plant 28 within the plant container 20 will need to be watered periodically to ensure survival of the transit to the final customer. The hydrophobic coating helps prevent premature breakdown of the plant container 20. In some embodiments, the hydrophobic coating layer is time dependent, and will resist water absorption for a set period of time, thereby enabling the plant container 20 to survive watering in transit, but to predictably decompose when planted in soil.

Also, for the lowermost vertically aligned slot set 24a-24f, the plurality of ring tabs 31a-31h from a lowermost ring 30c and the plurality of panel tabs 27a-27h from the panel 26 are inserted from opposite radial directions.

Advantageously, this provides for a mechanically strong coupling of the bottom 25 to the vertical wall 21, preventing collapse of the plant container 20 during movement. Moreover, the other additional rings 30a-30b provide further structural support for the plant container 20 for a strong and durable container. Moreover, helpfully, the decomposable material allows the plant container 20 to be directly planted in soil without removing the plant container 20. Lastly, the modular nature of the plant container 20 provides for easy shipping in a dissembled state, and assembly at the end point, such as a merchant.

Another aspect is directed to a method for making a plant container 20. The method comprises forming a vertical wall 21 to surround a plant receiving recess and having a plurality of vertically aligned slot sets 22a-22h, 23a-23h, 24a-24h therein, and forming a bottom 25 including a panel 26, and a plurality of panel tabs 27a-27h extending from a periphery 40 of the panel. The plurality of panel tabs 27a-27h is received by a lowermost vertically aligned slot set 24a-24h. The method comprises forming one or more rings 30a-30c having a plurality of ring tabs 31a-31h on an inner radial edge 41 thereof, the plurality of ring tabs to be received by a respective vertically aligned slot set 22a-22h, 23a-23h, 24a-24h.

Figure 8:
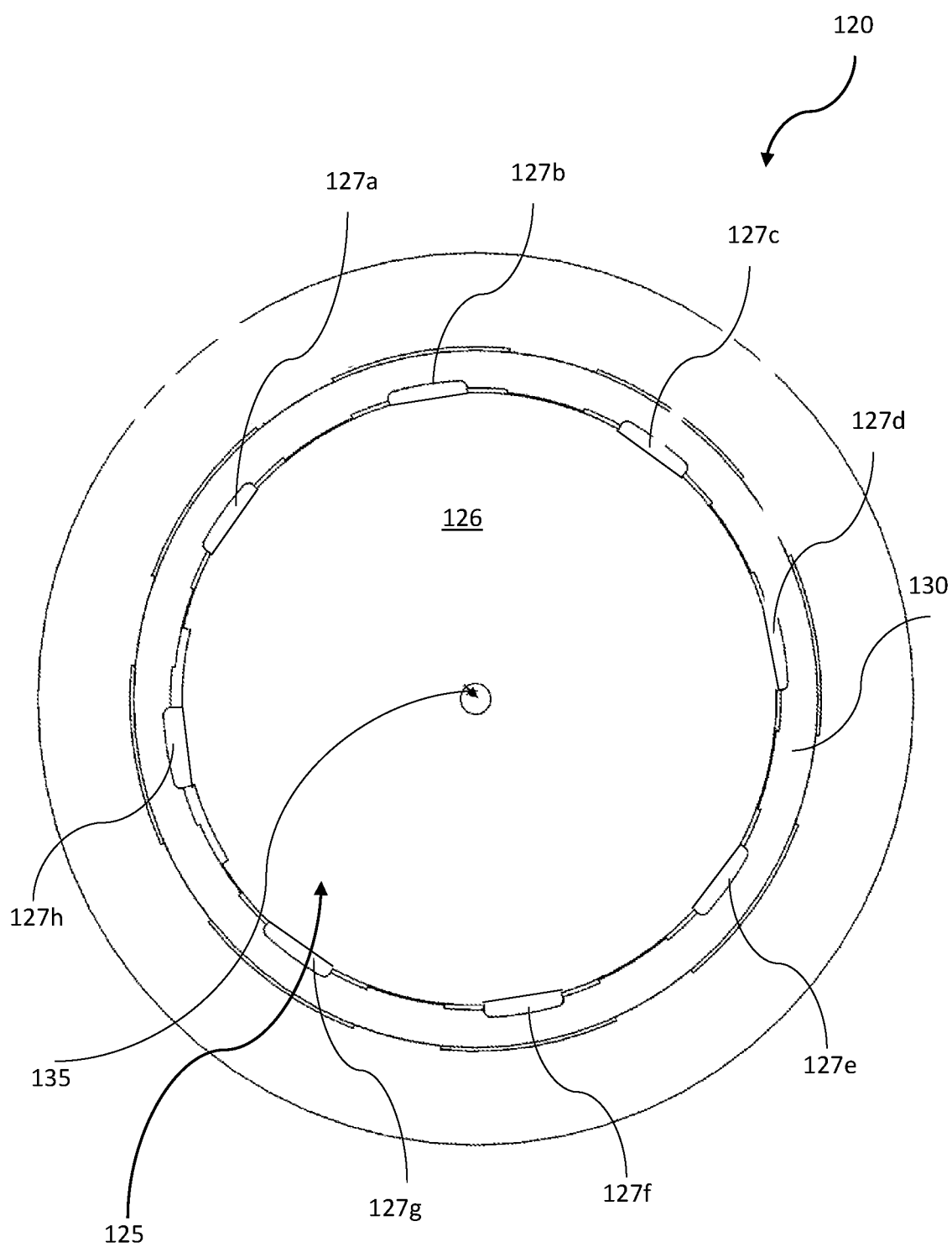
FIG. 8 is a schematic bottom plan view of the plant container, according to another embodiment of the present disclosure.

Referring now additionally to FIG. 8, another embodiment of the plant container 120 is now described. In this embodiment of the plant container 120, those elements already discussed above with respect to FIGS. 1-7 are incremented by 100 and most require no further discussion herein. This embodiment differs from the previous embodiment in that this plant container 120 illustratively includes a single ring 130.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:
1. A plant container comprising:
a vertical wall surrounding a plant receiving recess and having a plurality of vertically aligned slot sets therein;
a bottom including a panel, and a plurality of panel tabs extending from a periphery of said panel, said plurality of panel tabs to be received by a lowermost vertically aligned slot set; and
at least one flat ring having a plurality of opposing coplanar flat ring tab sets on an inner radial edge thereof, said plurality of opposing coplanar flat ring tab sets to be received by a respective vertically aligned slot set.

2. The plant container of claim 1 wherein said at least one flat ring comprises a plurality of flat rings.

3. The plant container of claim 1 wherein each panel tab comprises a proximal portion extending radially outward from the periphery of said panel, and a distal portion extending laterally to define first and second slots.

4. The plant container of claim 1 wherein each flat ring tab is rectangle-shaped.

5. The plant container of claim 1 wherein said panel includes a medial slot.

6. The plant container of claim 1 wherein said vertical wall comprises a trapezoid-shaped panel with opposing first and second edges, and a connection coupling together said opposing first and second edges.

7. The plant container of claim 1 wherein said vertical wall, said bottom, and said at least one flat ring comprise a decomposable material.

8. The plant container of claim 1 wherein said vertical wall, said bottom, and said at least one flat ring comprise a fiber material.

9. The plant container of claim 8 wherein said fiber material comprises at least one of old corrugated cartons (OCC), recycled bleached kraft (RBK), recycled refined bleach kraft (RRK), mid-density fiber (MDF), old news print (ONP), eucalyptus kraft (EK), eucalyptus refined kraft (ERK), eucalyptus bleached from mill (EBM), office white bleached kraft (OWB), agricultural grasses (AG), *Miscanthus giganteus* (MG), *Miscanthus giganteus* refined (MGR), peat fiber, coir, wheat straw, elephant grass, paper pulp, Bagasse fibers, wood fiber, flax, kenaf, sisal, and digested manure.

10. A decomposable plant container comprising:
   a vertical wall surrounding a plant receiving recess and having a plurality of vertically aligned slot sets therein;
   a bottom including a panel, and a plurality of panel tabs extending from a periphery of said panel, said plurality of panel tabs to be received by a lowermost vertically aligned slot set; and
   a plurality of flat rings, each flat ring having a plurality of opposing coplanar flat ring tab sets on an inner radial edge thereof, said plurality of opposing coplanar flat ring tab sets to be received by a respective vertically aligned slot set;
   said vertical wall, said bottom, and said plurality of flat rings comprising a decomposable material.

11. The decomposable plant container of claim 10 wherein each panel tab comprises a proximal portion extending radially outward from the periphery of said panel, and a distal portion extending laterally to define first and second slots.

12. The decomposable plant container of claim 10 wherein each flat ring tab is rectangle-shaped.

13. The decomposable plant container of claim 10 wherein said panel includes a medial slot.

14. The decomposable plant container of claim 10 wherein said vertical wall comprises a trapezoid-shaped panel with opposing first and second edges, and a connection coupling together said opposing first and second edges.

15. The decomposable plant container of claim 10 wherein said decomposable material comprises a fiber material.

16. The decomposable plant container of claim 15 wherein said fiber material comprises at least one of old corrugated cartons (OCC), recycled bleached kraft (RBK), recycled refined bleach kraft (RRK), mid-density fiber (MDF), old news print (ONP), eucalyptus kraft (EK), eucalyptus refined kraft (ERK), eucalyptus bleached from mill (EBM), office white bleached kraft (OWB), agricultural grasses (AG), *Miscanthus giganteus* (MG), *Miscanthus giganteus* refined (MGR), peat fiber, coir, wheat straw, elephant grass, paper pulp, Bagasse fibers, wood fiber, flax, kenaf, sisal, and digested manure.

17. A method for making a plant container comprising:
   forming a vertical wall to surround a plant receiving recess and having a plurality of vertically aligned slot sets therein;
   forming a bottom including a panel, and a plurality of panel tabs extending from a periphery of the panel, the plurality of panel tabs to be received by a lowermost vertically aligned slot set; and
   forming at least one flat ring having a plurality of opposing coplanar flat ring tab sets on an inner radial edge thereof, the plurality of opposing coplanar flat ring tab sets to be received by a respective vertically aligned slot set.

18. The method of claim 17 wherein the at least one flat ring comprises a plurality of flat rings.

19. The method of claim 17 wherein each panel tab comprises a proximal portion extending radially outward from the periphery of the panel, and a distal portion extending laterally to define first and second slots.

20. The method of claim 17 wherein each flat ring tab is rectangle-shaped.

* * * * *